United States Patent
Kim et al.

(10) Patent No.: US 9,826,223 B2
(45) Date of Patent: Nov. 21, 2017

(54) STEREOSCOPIC IMAGE DISPLAY DEVICE INCLUDING LIGHT SHIELDING PATTERN FORMED USING PHASE CHANGE INK COMPOSITION

(71) Applicant: LG CHEM, LTD., Seoul (KR)

(72) Inventors: Joon-Hyung Kim, Daejeon (KR);
Yong-Sung Goo, Daejeon (KR)

(73) Assignee: LG CHEM, LTD., Seoul (KR)

( * ) Notice: Subject to any disclaimer, the term of this patent is extended or adjusted under 35 U.S.C. 154(b) by 976 days.

(21) Appl. No.: 14/234,348

(22) PCT Filed: Nov. 13, 2013

(86) PCT No.: PCT/KR2013/010288
§ 371 (c)(1),
(2) Date: Jan. 22, 2014

(87) PCT Pub. No.: WO2014/077579
PCT Pub. Date: May 22, 2014

(65) Prior Publication Data
US 2016/0373732 A1    Dec. 22, 2016

(30) Foreign Application Priority Data

Nov. 13, 2012   (KR) .................. 10-2012-0128218
Nov. 11, 2013   (KR) .................. 10-2013-0136384

(51) Int. Cl.
*H04N 7/18*      (2006.01)
*H04N 13/04*    (2006.01)
(Continued)

(52) U.S. Cl.
CPC ......... *H04N 13/0434* (2013.01); *G02B 5/223* (2013.01); *G02B 27/26* (2013.01); *H04N 2213/001* (2013.01)

(58) Field of Classification Search
CPC .................. G06T 15/00; G02B 5/22
(Continued)

(56) References Cited

U.S. PATENT DOCUMENTS 7,443,392 B2 * 10/2008 Tsubaki .................. G09G 3/003
                                                                        345/419
7,808,564 B2    10/2010 Ta et al.
(Continued)

FOREIGN PATENT DOCUMENTS

JP      2001-330709         11/2001
JP      2001-330709 A      11/2001
(Continued)

*Primary Examiner* — Andy Rao
(74) *Attorney, Agent, or Firm* — Dentons US LLP (57) ABSTRACT

There are provided a stereoscopic image display device and a method of manufacturing the stereoscopic image display device. The stereoscopic image display device includes: an image generation unit generating a left-eye image and a right-eye image; a 3D filter layer disposed above the image generation unit, the 3D filter layer including a first region through which the right-eye image passes and a second region through which the left-eye image passes; and a light shielding pattern disposed between the image generation unit and the 3D filter layer in a position corresponding to a boundary portion between the first region and the second region. The light shielding pattern is formed of a phase change ink composition.

14 Claims, 3 Drawing Sheets

(51) Int. Cl.
*G02B 5/22* (2006.01)
*G02B 27/26* (2006.01)

(58) Field of Classification Search
USPC .................................................... 348/42–60
See application file for complete search history.

(56) References Cited

U.S. PATENT DOCUMENTS

| | | | |
|---|---|---|---|
| 2003/0017311 A1* | 1/2003 | Garitano | B41M 5/035 |
| | | | 428/195.1 |
| 2009/0040401 A1 | 2/2009 | Tamura et al. | |
| 2010/0055407 A1 | 3/2010 | Belelie et al. | |
| 2013/0128164 A1 | 5/2013 | Kim | |
| 2014/0071556 A1* | 3/2014 | Goo | G02B 5/201 |
| | | | 359/891 |

FOREIGN PATENT DOCUMENTS

| | | |
|---|---|---|
| JP | 2009-93059 | 4/2009 |
| JP | 2009-109968 | 5/2009 |
| KR | 10-2009-0015812 A | 2/2009 |
| KR | 1020090015812 A | 2/2009 |
| KR | 10-2010-0028509 A | 3/2010 |
| KR | 10-2010-0018090 A | 2/2012 |
| TW | 200617597 | 6/2006 |

\* cited by examiner

STEREOSCOPIC IMAGE DISPLAY DEVICE INCLUDING LIGHT SHIELDING PATTERN FORMED USING PHASE CHANGE INK COMPOSITION

This application is a national stage application of International Application No. PCT/KR2013/010288, filed on Nov. 13, 2013, which claims priority to and the benefit of Korean Patent Application Nos. 10-2012-0128218, filed Nov. 13, 2012 and 10-2013-0136384, filed on Nov. 11, 2013, in the Korean Intellectual Property Office, the entire content of which is incorporated herein by reference.

TECHNICAL FIELD

The present disclosure relates to a stereoscopic image display device including a light shielding pattern formed using a phase change ink composition.

BACKGROUND ART

In general, a cubic effect expressing three dimensions occurs due to disparity between two eyes, i.e., binocular disparity caused by two eyes spaced apart from each other by a distance of about 65 mm. Namely, when each of the left and right eyes of the human body sees two-dimensional images that are related to each other, these two images are transmitted to the brain via the retinas of the eyes, and the brain fuses the images together, to regenerate senses of depth and the presence of the original three-dimensionality of the imaged object, wherein such a capability is known as stereography.

Therefore, stereoscopic image display devices that display three-dimensional stereoscopic images on a two-dimensional screen using the above-mentioned principle have been suggested. Currently, such suggested stereoscopic image display devices may be divided into glasses type stereoscopic image display devices and non-glasses type stereoscopic image display devices. In general, glasses type stereoscopic image display devices include an image generation unit generating an image for the left eye and an image for the right eye, and a 3D filter layer changing the polarizing direction of the images for the left and right eyes generated in the image generation unit, wherein the images for the left and right eyes transmitting the 3D filter layer are respectively separated and transmitted through a left eye lens and a right eye lens so that three-dimensional images may be recognized in the brains of viewers.

The images generated in the image generation unit may proceed in various directions. For example, a portion of the image for the left eye may be transferred to a right eye region, or a portion of the image for the right eye may be transferred to a left eye region, to cause a cross-talk phenomenon in which the image for the left eye and the image for the right eye are seen in an overlapped state. If the cross-talk phenomenon occurs, viewers may see cloudy images and feel dizzy.

Accordingly, in order to minimize cross-talk regions, a method of arranging a color filter substrate and a 3D filter layer so that a black matrix formed on the color filter substrate may be placed at a boundary portion between a left eye region and a right eye region of the 3D filter layer have been suggested. However, since a substrate exists between the 3D filter layer and the black matrix formed on the color filter, optical path errors corresponding to the thickness of the substrate may be caused, and it may also be practically difficult to arrange the color filter so that the black matrix of the color filter may not be accurately placed at the boundary portion between the left eye region and the right eye region.

In the related art, to address such limitations, the width of the black matrix is extended so that optical path error and pattern adjusting errors may be offset by each other. In this case, however, the amount of shielded light may be increased, resulting in a decrease in the brightness of image display devices.

In the related art, black matrices are mainly produced by a photolithography method or a printing method. In the printing method, curable ink including a solvent, a monomer/oligomer having unsaturated double bonds, a pigment or dye, a photoinitiator, and an additive is printed to form a black matrix. The photolithography method has limitations such as large consumption of unnecessary materials, a relatively complicated processes, large line width variations according to the surface state of a base material caused by high spreadability of curable inks, and non-uniform pattern line heights caused by the formation of non-flat but concave or convex patterns as a result of a difference in solvent volatilization rates between central portions and edge portions of the patterns during drying. It is difficult to obtain a cross-talk preventing effect if line widths and line heights of patterns are not constant, as described above. Furthermore, since it is difficult to form patterns having high aspect ratios by using such curable ink compositions, fine lines not wider than 60 μm are formed to have low heights, and thus a sufficient light shielding effect may not be obtained.

Accordingly, it is required to develop stereoscopic image display devices capable of effectively reducing cross-talk while minimizing a drop in the brightness thereof.

DISCLOSURE

Technical Problem

An aspect of the present disclosure may provide a stereoscopic image display device improving a cross-talk phenomenon by forming a fine and elaborate light shielding pattern using a phase change ink composition.

An aspect of the present disclosure may also provide a method of manufacturing a stereoscopic image display device capable of reducing a cross-talk region.

Embodiments of the present disclosure are not limited to the above-mentioned aspects of the present disclosure. Aspects of the present disclosure will be understood from the following description, and those of ordinary skill in the art will easily understand the scope and spirit of the present disclosure.

Technical Solution

According to an aspect of the present disclosure, a stereoscopic image display device may includes: an image generation unit generating a left-eye image and a right-eye image; a 3D filter layer disposed above the image generation unit, the 3D filter layer including a first region through which the right-eye image passes and a second region through which the left-eye image passes; and a light shielding pattern disposed between the image generation unit and the 3D filter layer in a position corresponding to a boundary portion between the first region and the second region, wherein the light shielding pattern is formed of a phase change ink composition.

The phase change ink composition may include: 3 to 93 parts by weight of a phase change material; 3 to 30 parts by weight of a coloring agent; 3 to 90 parts by weight of a reactive monomer, an oligomer, or a mixture thereof; and 0.1 to 10 parts by weight of a photopolymerization initiator, a photo-crosslinking sensitizer, or a mixture thereof, wherein the phase change ink composition may have a melting point of from 50° C. to 120° C.

The phase change ink composition may further include a polymer binder, a solvent, a dispersant, an adhesion promoter, an antioxidant, an ultraviolet light absorber, or a thermal polymerization inhibitor as occasion demands.

The phase change ink composition may be in a solid state at a temperature ranging from 50° C. to 200° C. although the phase change ink composition is reheated after the phase change ink composition is cured with active energy rays.

In a stereoscopic image display device of the present disclosure, the light shielding pattern may have a line width of from 10 µm to 150 µm and a line height of from 0.3 µm to 5 µm. However, the line width and line height of the light shielding pattern are not limited to the respective ranges. More specifically, the line width and line height of the light shielding pattern may be varied according to the size and resolution of the stereoscopic image display device. For instance, the light shielding pattern may have a line width of about 50 µm and a line height of about 2 µm in a 40 inch Full-HD TV.

Furthermore, the light shielding pattern may have an aspect ratio of from 1% to 20%, where the aspect ratio is a ratio of the line height to the line width (line height/line width).

Further, the light shielding pattern may have a flat surface formed on a top thereof, wherein a ratio of a width of the flat surface to the line width of the light shielding pattern may be from about 50% to about 100%, the flat surface may have a maximum roughness value $R_{max}$ of 100 nm or less, preferably, from 0.1 nm to 50 nm.

The stereoscopic image display device may further include an adhesion layer disposed between the image generation unit and the 3D filter layer.

According to another aspect of the present disclosure, a method of manufacturing a stereoscopic image display device may include: applying a phase change ink composition to a top of an image generation unit or a bottom of a 3D filter layer to form a light shielding pattern in a position corresponding to a boundary portion between a first region and a second region of the 3D filter layer; disposing the 3D filter layer on top of the image generation unit; and radiating active energy rays so as to cure the light shielding pattern.

The applying of the phase change ink composition may be performed at a temperature from Tb to (Tb+100° C.) when the phase change ink composition has a melting point of Tb.

The method of manufacturing the stereoscopic image display device may further include pressing the light shielding pattern after the applying of the phase change ink composition or the disposing of the 3D filter layer.

The pressing of the light shielding pattern may be performed at a temperature from (Tb−20° C.) to (Tb+15° C.) when the phase change ink composition has a melting point of Tb.

The pressing of the light shielding pattern may be performed at a pressure of from 0.01 MPa to 50 MPa.

Features of embodiments of the present disclosure have not been fully listed. Various other features of the embodiments of the present disclosure and resulting effects may be understood more fully by referring to the following description.

Advantageous Effects

In the stereoscopic image display devices of the present disclosure, the light shielding pattern having a fine and uniform line height and line width is formed of the phase change ink composition, and thus the light shielding pattern may effectively prevent a cross-talk phenomenon while minimizing a drop in brightness.

BEST MODE

Hereinafter, embodiments of the present disclosure will be described in detail with reference to the accompanying drawings.

Inventors of the present disclosure repeatedly conducted research in order to develop a stereoscopic image display device capable of improving cross-talk phenomena while minimizing a drop in the brightness thereof. As a result, the inventors of the present disclosure have developed a stereoscopic image display device including a light shielding pattern formed of a phase change ink composition.

In detail, a stereoscopic image display device of an embodiment of the present disclosure includes: an image generation unit generating a left-eye image and a right-eye image; a 3D filter layer disposed above the image generation unit, the 3D filter layer including a first region through which the right-eye image passes and a second region through which the left-eye image passes; and a light shielding pattern disposed between the image generation unit and the 3D filter layer in a position corresponding to a boundary portion between the first region and the second region, wherein the light shielding pattern is formed of a phase change ink composition.

Figure 1:
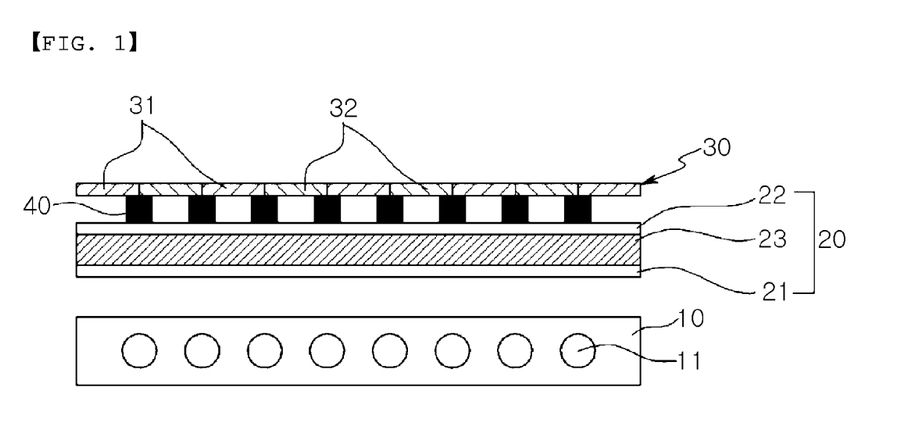
FIG. 1 is a view illustrating a stereoscopic image display device according to an embodiment of the present disclosure.
Figure 2:
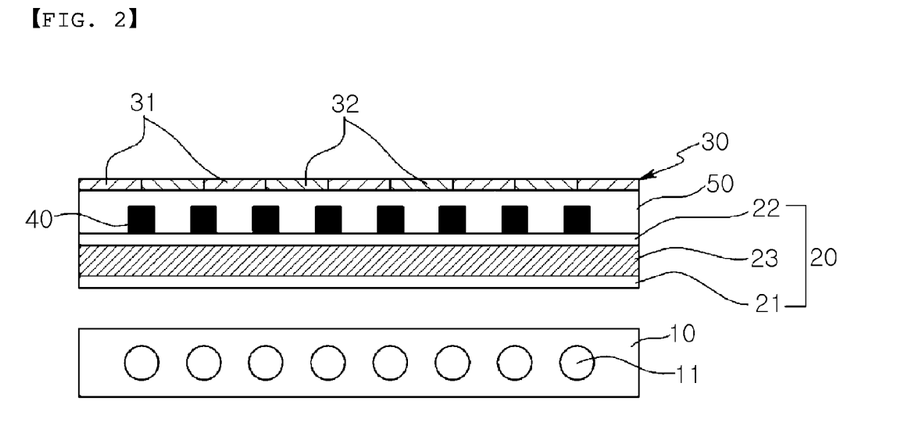
FIG. 2 is a view illustrating a stereoscopic image display device according to another embodiment of the present disclosure.
Figure 3:
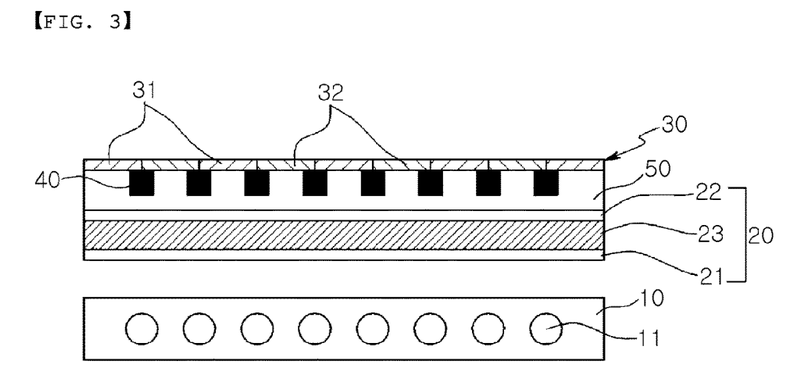
FIG. 3 is a view illustrating a stereoscopic image display device according to another embodiment of the present disclosure.

Stereoscopic image display devices are illustrated in FIG. 1 to FIG. 3 according to exemplary embodiments of the present disclosure. Hereinafter, respective components of the stereoscopic image display devices of the embodiments of the present disclosure will be described in more detail by referring to FIG. 1 to FIG. 3.

As illustrated in FIG. 1 to FIG. 3, the stereoscopic image display devices according to the embodiments of the present disclosure include an image generation unit 20, a 3D filter layer 30 and a light shielding pattern 40, and may further include a backlight unit 10 for supplying light to the image generation unit 20 as occasion demands.

The image generation unit 20 generates an image for the left eye and an image for the right eye, and the image generation unit 20 may include display panels capable of generating images such as an LCD panels, without limitations thereon, a PDP panel, an OLED panel, an LED-array panel, and an FED panel. As illustrated in FIGS. 1 to 3, although examples of the image generation unit 20 may include display panels including a top substrate 22, a bottom substrate 21, and a liquid crystal cell 23 disposed between the top substrate 22 and the bottom substrate 21, the image generation unit 20 is not limited to the display panels. The top substrate 22 and the bottom substrate 21 may be a color filter substrate and a thin film transistor array substrate, respectively.

Next, the 3D filter layer 30 changing polarizing states of the image for the left eye and of the image for the right eye generated in the image generation unit 20 is placed above the image generation unit 20, and includes a first region 31 through which the image for the right eye passes and a second region 32 through which the image for the left eye passes. The first region 31 and the second region 32 change optical axes of incident light so as to change the polarizing state of the light, and extents to which the optical axes of the first region 31 and the second region 32 are changed are different from each other so that the image for the left eye and the image for the right eye may have different polarizing states. As a result, the image for the right eye only passes through a right eye lens, and the image for the left eye only passes through a left eye lens. Since such a principle in which stereoscopic images are displayed using the 3D filter layer has widely been known in the related art, a more detailed description of the principle is omitted.

In the 3D filter layer 30 of the embodiments of the present disclosure, first regions 31 and second regions 32 of the 3D filter layer 30 may be alternately arranged, for example, in a stripe pattern or a checkerboard pattern.

As described above, although a left-eye image has to be recognized only by the left eye of a viewer and a right-eye image has to be recognized only by the right eye of the viewer, so that the viewer may recognize stereoscopic images on the stereoscopic image display device, there is a case that the right-eye image is recognized by the left eye of the viewer or the left-eye image is recognized by the right eye of the viewer. Such a phenomenon is known as image cross-talk or a cross-talk phenomenon. Therefore, stereoscopic image display devices of the related art may have low image quality due to such cross-talk between left-eye and right-eye images.

According to the embodiments of the present disclosure, the stereoscopic image display device includes a light shielding pattern 40 between the image generation unit 20 and the 3D filter layer 30 in order to prevent the cross-talk phenomenon. Herein, the term "light shielding pattern (40)" is a concept including patterns termed black matrix, stripe, and the like. In addition, the light shielding pattern 40 may include any other structure used to shield light in the related art.

In the embodiments of the present disclosure, the light shielding pattern 40 is formed of a phase change ink composition. Phase change ink refers to an ink which exists in a solid state at room temperature, but which is converted from solid into liquid at an operating temperature of an inkjet device so that the ink is sprayed in the form of liquid and adhered to a printing medium, and then the adhered ink is rapidly solidified to form a pattern.

As described above, curable inks of the related art used to form black matrixes are difficult to form patterns having uniform line widths, uniform line heights, high aspect ratios due to high spreadability. However, since phase change inks are discharged and solidified simultaneously if the phase change inks are used in light shielding patterns, patterns having uniform line widths and line heights regardless of the surface state of a base material may be formed, and predetermined levels or higher of line heights may be uniformly maintained while forming fine line widths so that patterns with high aspect ratios may be formed.

In more detail, the phase change ink composition of the embodiments of the present disclosure may include: a phase change material; a coloring agent; a reactive monomer, an oligomer, or a mixture thereof; and a photopolymerization initiator, photo-crosslinking sensitizer, or a mixture thereof.

The phase change material may be contained in the phase change ink composition in an amount of from 3 to 93 parts by weight with respect to the total content of a phase change ink. For instance, the phase change material may be contained in the phase change ink composition in an amount of from 4 to 80 parts by weight or from 10 to 70 parts by weight with respect to the total content of the phase change ink. The phase change ink composition may not have phase change characteristics if the phase change material is contained in the phase change ink composition in an amount of less than 3 parts by weight, and the light shielding pattern may have insufficient light shielding properties since the consumption amount of a material exhibiting black color is resultantly limited if the phase change material is contained in the phase change ink composition in an amount of more than 93 parts by weight.

The phase change material may include, but not be limited thereto, one or more selected from the group consisting of fatty acids, higher alcohols, and waxes that are in the solid state at room temperature. Specific examples of the phase change material may include: fatty acids such as decanoic acid, undecanoic acid, dodecanoic acid, tridecanoic acid, tetradecanoic acid, pentadecanoic acid, hexadecanoic acid, heptadecanoic acid, octadecanoic acid, nonadecanoic acid, eicosanoic acid, heneicosanoic acid, docosanoic acid, tricosanoic acid, tetracosanoic acid, pentacosanoic acid, hexacosanoic acid, heptacosanoic acid, octacosanoic acid, nonacosanoic acid, triacontanoic acid, hentriacontanoic acid, dotriacontanoic acid, tritriacontanoic acid, tetratriacontanoic acid, pentatriacontanoic acid, and hexatriacontanoic acid; higher alcohols such as decanol, undecanol, dodecanol, tridecanol, tetradecanol, pentadecanol, hexadecanol, hepadecanol, octadecanol, nonadecanol, eicosanol, heneicosanol, docosanol, docosanol, tricosanol, tetracosanol, pentacosanol, hexacosanol, heptacosanol, octacosanol, nonacosanol, triacontanol, hentriacontanol, dotriacontanol, tritriacontanol, tetratriacontanol, pentatriacontanol, and hexatriacontanol; and waxes including mineral-derived waxes such as paraffin wax, fine crystalline wax, Barnsdall wax, ozokerite, ceresin and montan wax, plant-derive waxes such as carnauba wax, ouricury wax, candellia wax, Japan wax and coconut butter, animal-derive waxes such as beeswax and spermaceti, and synthesized waxes such as polyethylene wax, polyoxyethylene glycol wax, halogenated hydrocarbon wax, and wax ester. However, the phase change material is not limited to the examples.

Next, the coloring agent may include, but not be limited thereto, pigments or dyes, wherein the pigments may include both inorganic pigments and organic pigments. Although the coloring agent is not limited to the following examples, specific examples of the coloring agent may include one or more of pigments, dyes, or combinations thereof. For instance, usable black pigments may include carbon black, graphite, and metal oxides. Examples of the carbon black may include Sisto 5HIISAF-HS, Cisto KH, Cisto 3HHAF-HS, Cisto NH, Cisto 3M, Cisto 300HAF-LS, Cisto 116HMMAF-HS, Cisto 116MAF, Cisto FMFEF-HS, Cisto SOFEF, Cisto VGPF, Cisto SVHSRF-HS, and Cisto SSRF produced by Tokai Carbon Co., Ltd; Diagram Black II, Diagram Black N339, Diagram Black SH, Diagram Black H, Diagram LH, Diagram HA, Diagram SF, Diagram N550M, Diagram M, Diagram E, Diagram G, Diagram R, Diagram N760M, Diagram LR, #2700, #2600, #2400, #2350, #2300, #2200, #1000, #980, #900, MCF88, #52, #50, #47, #45, #45L, #25, #CF9, #95, #3030, #3050, MA7, MA77, MA8, MA11, MA100, MA40, OIL7B, OIL9B, OIL11B, OIL30B, and OIL31B produced by the Mitsubishi Chemical Corporation; PRINTEX-U, PRINTEX-V, PRINTEX-140U, PRINTEX-140V, PRINTEX-95, PRINTEX-85, PRINTEX-75, PRINTEX-55, PRINTEX-45, PRINTEX-300, PRINTEX-35, PRINTEX-25, PRINTEX-200, PRINTEX-40, PRINTEX-30, PRINTEX-3, PRINTEX-a, SPECIAL BLACK-550, SPECIAL BLACK-350, SPECIAL BLACK-250, SPECIAL BLACK-100, and LAMP BLACK-101 produced by the Degussa Corporation; and RAVEN-1100ULTRA, RAVEN-1080ULTRA, RAVEN-1060ULTRA, RAVEN-1040, RAVEN-1035, RAVEN-1020, RAVEN-1000, RAVEN-890H, RAVEN-890, RAVEN-880ULTRA, RAVEN-860ULTRA, RAVEN-850, RAVEN-820, RAVEN-790ULTRA, RAVEN-780ULTRA, RAVEN-760ULTRA, RAVEN-520, RAVEN-500, RAVEN-460, RAVEN-450, RAVEN-430ULTRA, RAVEN-420, RAVEN-410, RAVEN-2500ULTRA, RAVEN-2000, RAVEN-1500, RAVEN-1255, RAVEN-1250, RAVEN-1200, RAVEN-1190ULTRA, and RAVEN-1170 produced by the Columbia Carbon Corporation.

Further, the dyes may be black dyes, and examples of the black dyes may include products with C.I names of SOLVENT BLACK 7, SOLVENT BLACK 34, SOLVENT BLACK 27, SOLVENT BLACK 29, ACID BLACK 1, or DYE SALT BLACK produced by the BASF Corporation, the Bayer Corporation, or Dong Yang Ink Co., Ltd.

Although the content of the coloring agent is not limited, the content of the coloring agent may preferably be in a range of from about 3 to about 30 parts by weight with respect to the total content of the phase change ink. For instance, the content of the coloring agent may be in a range of from 4 to 20 parts by weight or from 5 to 10 parts by weight. If the coloring agent is contained in the phase change ink composition in an amount of more than 30 parts by weight, the dyes may not be sufficiently melted, and it is difficult to disperse the pigments into the phase change ink composition to result in an occurrence of a phenomenon that lumps larger than an outlet of an inkjet head nozzle are formed in the phase change ink composition. Therefore, it may be difficult to discharge the phase change ink composition from the outlet of the inkjet head nozzle. Further, if the coloring agent is contained in the phase change ink composition in an amount of less than 3 parts by weight, light shielding properties may not be sufficient.

Although examples of the reactive monomer or oligomer may include functional monomers or oligomers having ethylenically unsaturated bonds and monomers or oligomers enabling ring-opening polymerization as materials that are capable of being cured by radiation or electron beam, the reactive monomer or oligomer is not limited to the examples. For instance, the reactive monomer or oligomer may be materials including acryl derivatives, bisphenol A derivatives, epoxy or oxetane groups.

In more detail, the reactive monomer or oligomer in the embodiments of the present disclosure may include: one or more monofunctional monomers selected from the group consisting of methoxy polyethyleneglycol mono(meth)acrylate, stearyl mono(meth)acrylate, lauryl mono(meth)acrylate, tetrahydrofurfuryl mono(meth)acrylate, lauryl mono (meth)acrylate, isodecyl mono(meth)acrylate, isooctyl mono(meth)acrylate, octyl mono(meth)acrylate, decyl mono(meth)acrylate, tridecyl mono(meth)acrylate, caprolactone mono(meth)acrylate, phenol (meth)acrylate, polyethyleneglycol mono(meth)acrylate, polypropyleneglycol mono (meth)acrylate, and phenoxyethyl (meth)acrylate; one or more polyfunctional monomers selected from the group consisting of 1,3-butyleneglycol di(meth)acrylate, 1,4-butandiol di(meth)acrylate, diethyleneglycol di(meth)acrylate, 1,6 hexandiol di(meth)acrylate, neopentyl glycol di(meth) acrylate, polyethyleneglycol di(meth)acrylate, tetraethyleneglycol di(meth)acrylate, triethyleneglycol di(meth)acrylate, tripropyleneglycol di(meth)acrylate, bisphenol A di(meth)acrylate, dipropyleneglycol di(meth)acrylate, metallic di(meth)acrylate, acrylate ester and its derivatives, trimethylolethane tri(meth)acrylate, trimethylolpropane tri (meth)acrylate, neopentylglycol (meth)acrylate, pentaerythritol tetra(meth)acrylate, pentaerythritol tri(meth)acrylate, dipentaerythritol penta(meth)acrylate, and dipentaerythritol hexa(meth)acrylate; urethane-based polyfunctional acrylates U-324-A, U15HA, and U-4HA; epoxyacrylate and novolac-epoxy acrylate of bisphenol A derivatives; epoxy group-containing ethyleneically unsaturated monomers such as aryl glycidyl ether, glycidyl 5-nobonen-2-methyl-2-carboxylate (mixture of endo and exo), 1,2-epoxy-5-hexene, 1,2-epoxy-9-decene, 3,4-glycidyl (meth)acrylate, glycidyl α-ethyl (meth)acrylate, glycidyl α-n-propyl (meth)acrylate, glycidyl α-n-butyl (meth)acrylate, 3,4-epoxybutyl (meth) acrylate, 4,5-epoxypentyl (meth)acrylate, 5,6-epoxyheptyl (meth)acrylate, 6,7-epoxyheptyl α-ethylacrylate, and methylglycidyl (meth)acrylate; and one or more selected from the group consisting of 3-ethyl-3-)2-ethylhexyloxymethyl) oxetane monofunctional oxetane containing an oxetane group, monofunctional oxetane containing 3-ethyl-3-phenoxymethyloxetane as an aromatic group, 1,4-bis[(3-ethyloxetane-3-il)methoxymethyl] benzene, 1,4-bis[(3-ethyloxetane-3-il)methoxy] benzene, 1,3-bis[(3-ethyloxetane-3-il) methoxy] benzene, 1,2-bis[(3-ethyloxetane-3-il)methoxy] benzene, 4,4'-bis[(3-ethyloxetane-3-il)methoxy] biphenyl, 2,2'-bis[(3-ethyloxetane-3-il)methoxy] biphenyl, 3,3',5,5'-tetramethyl-4,4'-bis[(3-ethyloxetane-3-il)methoxy] biphenyl, 2,7-bis[(3-ethyloxetane-3-il)methoxy] naphthalene, bis [4-{3-ethyloxetane-3-il}methoxy]phenyl]methane, bis[2-{3-ethyloxetane-3-il}methoxy]phenyl]methane, 2,2-bis[4-{3-ethyloxetane-3-il}methoxy]phenyl]propane, 3(4),8(9)-bis[{3-ethyloxetane-3-il}methoxymethyl]-tricyclodecane, 2,3-bis[(3-ethyloxetane-3-il)methoxymethyl]norbornane, 1,1,1-tris[(3-ethyloxetane-3-il)methoxymethyl]propane, 1-butoxy-2,2-bis[(3-ethyloxetane-3-il)methoxymethyl]butane, 1,2-bis[{2-(3-ethyloxetane-3-il)methoxy}ethylthio] ethane, bis[{4-(3-ethyloxetane-3-il)methylthio}phenyl]sulfide, 1,6-bis[(3-ethyloxetane-3-il)methoxy]-2,2,3,3,4,4,5,5-octafluorohexane, 3-[(3-ethyloxetane-3-il)methoxy] propyltrimethoxysilane, and 3-[(3-ethyloxetane-3-il) methoxy]propyltriethoxysilane.

Meanwhile, although the content of the reactive monomer, oligomer or the mixture thereof is not limited, the content of the reactive monomer, oligomer or the mixture thereof may be in a range of from about 3 to about 90 parts by weight with respect to the total content of the phase change ink. For instance, the content of the reactive monomer, oligomer or the mixture thereof may be in a range of from about 5 to about 60 parts by weight, from about 8 to about 50 parts by weight, or from about 10 to about 30 parts by weight. If the content of the reactive monomer, oligomer or the mixture thereof is in an amount range of more than 90 parts by weight with respect to the total content of the phase change ink, a total content of the phase change material and the coloring agent is decreased resultingly so that phase change characteristics of the phase change ink composition are not well exhibited, or formed patterns may not sufficiently shield light.

Meanwhile, the phase change ink composition includes the photopolymerization initiator, the photo-crosslinking sensitizer, or the mixture thereof. Although the photopolymerization initiator is not limited, the photopolymerization initiator may include radical photopolymerization initiators or cationic photopolymerization initiators that are known in the related art.

For instance, the photopolymerization initiator may include: triazine compounds such as 2,4-trichloromethyl-(4'-methoxyphenyl)-6-triazine, 2,4-trichloromethyl-(4'-methoxystyryl)-6-triazine, 2,4-trichloromethyl-(fipronil)-6-triazine, 2,4-trichloromethyl-(3',4'-dimethoxyphenyl)-6-triazine, and 3-{4-[2,4-bis(trichloromethyl)-s-triazine-6-il]phenylthiol}propanoic acid; biimidazole compounds such as 2,2'-bis(2-chlorophenyl)-4,4',5,5'-tetraphenyl biimidazole, 2,2'-bis(2,3-dichlorophenyl)-4,4',5,5'-tetraphenyl biimidazole, and the like; acetophenone based compounds such as 2-hydroxy-2-methyl-1-phenylpropane-1-on, 1-(4-isopropylphenyl)-2-hydroxy-2-methylpropane-1-on, 4-(2-hydroxyethoxy)-phenyl(2-hydroxy)propyl ketone, 1-hydroxycyclohexylphenyl ketone, benzoinbutyl ether, 2,2-dimethoxy-2-phenyl acetone, 2-methyl-(4-methylthiophenyl)-2-morpholino-1-propane-1-on, 2-benzyl-2-dimethylamino-1-(4-morphoninophenyl)-butane-1-on, and the like; benzophenone based compounds such as benzophenone, 4,4'-bis(dimethylamino)benzophenone, 4,4'-bis(diethylamino)benzophenone, 2,4,6-trimethylaminobenzophenone, methyl-o-benzoylbenzoate, 3,3-dimethyl-4-methoxybenzophenone, 3,3',4,4'-tetra(t-butylperoxycarbonyl)benzophenone, and the like; fluorenone based compounds such as 9-fluorenone, 2-chloro-9-fluorenone, 2-methyl-9-fluorenone, and the like; thioxanthone based compounds such as thioxanthone, 2,4-diethyl thioxanthone, 2-chloro thioxanthone, 1-chloro-4-propyloxy thioxanthone, isopropyl thioxanthone, diisopropyl thioxanthone, and the like; xanthone based compounds such as xanthone, 2-methylxanthone, and the like; anthraquinone based components such as anthraquinone, 2-methylanthraquinone, 2-ethylanthraquinone, t-butyl anthraquinone, 2,6-dichloro-9,10-anthraquinone, and the like; acridine based compounds such as 9-phenylacridine, 1,7-bis(9-acridinyl)heptane, 1,5-bis(9-acridinyl)pentane, 1,3-bis(9-acridinyl)propane, and the like; dicarbonyl compounds such as benzyl, 1,7,7-trimethyl-bischlo[2,2,1]heptanes-2,3-dion, 9,10-phenanthrenequinone, and the like; phosphine oxide based compounds such as 2,4,6-trimethylbenzoyl diphenylphosphine oxide, bis(2,6-dimethoxybenzoyl)-2,4,4-trimethylpentyl phosphine oxide, bis(2,6-dichlorobenzoyl)propylphosphine oxide, and the like; amine based compounds such as methyl-4-(dimethylamino)benzoate, ethyl-4-(dimethylamino)benzoate, 2-n-butoxyethyl-4-(dimethylamino)benzoate, 2,5-bis(4-diethylaminobenzal)cyclopentanone, 2,6-bis(4-diethylaminobenzal)cyclohexanone, 2,6-bis(4-diethylaminobenzal)-4-methyl-cyclohexanone, and the like; coumarin based compounds such as 3,3'-carbonylvinyl-7-(diethylamino)coumarin, 3-(2-benzothiazolil)-7-(diethylamino)coumarin, 3-benzoyl-7-(diethylamino)coumarin, 3-benzoyl-7-methoxy-coumarin, 10,10'-carbonylbis[1,1,7,7-tetramethyl-2,3,6,7-tetrahydro-1H,5H,11H-C1]-benzopyrano[6,7,8-ij]-guinolizine-11-on, and the like; chalcone compounds such as 4-diethylamino chalcone, 4-azidbenzalacetophenone, and the like; 2-benzoylmethylene, 3-methyl-β-naphthothiazoline, or a mixture thereof.

Further, the photopolymerization initiator may include a cationic photopolymerization initiator which is a compound producing cation species or Lewis acids when irradiated with active energy rays. Examples of the photopolymerization initiator may include an iron-arene complex, and an onium salt such as an aromatic diazonium salt, an aromatic iodine aluminum salt, or an aromatic sulfonium salt.

Meanwhile, a photo-crosslinking sensitizer may be used according to efficiency of the photopolymerization initiator, and the photo-crosslinking sensitizer is not limited. Examples of the photo-crosslinking sensitizer may include: benzophenone based compounds such as benzophenone, 4,4-bis(dimethylamino)benzophenone, 4,4-bis(diethylamino)benzophenone, 2,4,6-trimethylaminobenzophenone, methyl-o-benzoylbenzoate, 3,3-dimethyl-4-methoxybenzophenone, 3,3,4,4-tetra(t-butylperoxycarbonyl)benzophenone, and the like; fluorenone based compounds such as 9-fluorenone, 2-chloro-9-fluorenone, 2-methyl-9-fluorenone, and the like; thioxanthone based compounds such as thioxanthone, 2,4-diethyl thioxanthone, 2-chlorothioxanthone, 1-chloro-4-propyloxythioxanthone, isopropyl thioxanthone, diisopropyl thioxanthone, and the like; xanthone based compounds such as xanthone, 2-methylxanthone, and the like; anthraquinone based components such as anthraquinone, 2-methylanthraquinone, 2-ethylanthraquinone, t-butyl anthraquinone, 2,6-dichloro-9,10-anthraquinone, and the like; acridine based compounds such as 9-phenylacridine, 1,7-bis(9-acridinyl)heptane, 1,5-bis(9-acridinyl)pentane, 1,3-bis(9-acridinyl)propane, and the like; dicarbonyl compounds such as benzyl, 1,7,7-trimethyl-bischlo[2,2,1]heptanes-2,3-dion, 9,10-phenanthrenequinone, and the like; phosphine oxide based compounds such as 2,4,6-trimethylbenzoyl diphenylphosphine oxide, bis(2,6-dimethoxybenzoyl)-2,4,4-trimethylpentyl phosphine oxide, and the like; benzophenone based compounds such as methyl-4-(dimethylamino)benzoate, ethyl-4-(dimethylamino)benzoate, 2-n-butoxyethyl-4-(dimethylamino)benzoate, and the like; amino synergists such as 2,5-bis(4-diethylaminobenzal)cyclopentanone, 2,6-bis(4-diethylaminobenzal)cyclohexanone, 2,6-bis(4-diethylaminobenzal)-4-methyl-cyclopentanone, and the like; coumarin based compounds such as 3,3'-carbonylvinyl-7-(diethylamino)coumarin, 3-(2-benzothiazolil)-7-(diethylamino)coumarin, 3-benzoyl-7-(diethylamino)coumarin, 3-benzoyl-7-methoxy-coumarin, 10,10'-carbonylbis[1,1,7,7-tetramethyl-2,3,6,7-tetrahydro-1H,5H,11H-C1]-benzopyrano[6,7,8-ij]-quinolizine-11-on, and the like; chalcone compounds such as 4-diethylamino chalcone, 4-azidbenzalacetophenone, and the like; 2-benzoylmethylene, 3-methyl-β-naphthothiazoline, or and the like.

Meanwhile, although content of the photopolymerization initiator, the photo-crosslinking sensitizer, or a mixture thereof is not limited, the content of the photopolymerization initiator, the photo-crosslinking sensitizer, or the mixture thereof may be in a range of from about 0.1 to about 10 parts by weight with respect to the total content of the phase change ink. For instance, the content of the photopolymerization initiator, the photo-crosslinking sensitizer, or the mixture thereof may be in a range of from about 0.3 to about 5 parts by weight, or from about 0.5 to about 3 parts by weight. The photopolymerization initiator, the photo-crosslinking sensitizer, or the mixture thereof may be required when performing ultraviolet curing, wherein if the content of the photopolymerization initiator, the photo-crosslinking sensitizer, or the mixture thereof is in an amount range of more than 10 parts by weight with respect to the total content of the phase change ink, equipment or a surrounding environment may be contaminated by sublimation of the photopolymerization initiator or the photo-crosslinking sensitizer when heating the phase change ink.

The phase change ink composition may further include a polymer binder as occasion demands, and some of the polymer binder may be included in the form of a pigment dispersant. Although content of the polymer binder is not limited, the content of the polymer binder may be an amount of 500 parts by weight or less with respect to 100 parts by weight of the phase change material. For instance, the content of the polymer binder may be in a range of from 1 to 300 parts by weight or from 100 to 200 parts by weight. If the polymer binder is contained in the phase change ink composition in an amount of more than 500 parts by weight with respect to 100 parts by weight of the phase change material, it may be difficult to discharge the phase change ink composition since viscosity of the phase change ink composition in a liquid state is increased when increasing a temperature of the phase change ink composition.

The polymer binder is not particularly limited if the polymer binder is a polymer that is melted into the phase change ink composition. For instance, the polymer binder may include: one or more unsaturated carboxylate esters selected from the group consisting of benzyl (meth)acrylate, methyl (meth)acrylate, ethyl (meth)acrylate, butyl (meth) acrylate, dimethylaminoethyl (meth)acrylate, isobutyl (meth)acrylate, t-butyl (meth)acrylate, cyclohexyl (meth) acrylate, isobonyl (meth)acrylate, ethylhexyl (meth)acrylate, 2-phenoxyethyl (meth)acrylate, tetrahydrofurfuryl (meth)acrylate, hydroxyethyl (meth)acrylate, 2-hydroxypropyl (meth)acrylate, 2-hydroxy-3-chloropropyl (meth)acrylate, 4-hydroxybutyl (meth)acrylate, acyloctyloxy-2-hydroxypropyl (meth)acrylate, glycerol (meth)acrylate, 2-methoxyethyl (meth)acrylate, 3-methoxybutyl (meth) acrylate, ethoxydiethyleneglycol (meth)acrylate, methoxytriethyleneglycol (meth)acrylate, methoxytripropyleneglycol (meth)acrylate, poly(ethyleneglycol)methylether (meth)acrylate, phenoxydiethyleneglycol (meth)acrylate, p-nonylphenoxypolyethyleneglycol (meth)acrylate, p-nonylphenoxypolypropyleneglycol (meth)acrylate, glycidyl (meth)acrylate, tetrafluoropropyl (meth)acrylate, 1,1, 1,3,3,3-hexafluoroisopropyl (meth)acrylate, octafluoropentyl (meth)acrylate, heptadecafluorodecyl (meth)acrylate, tribromophenyl (meth)acrylate, dicyclopentanyl (meth) acrylate, dicyclopentenyl (meth)acrylate, dicyclopentenyloxyethyl acrylate, isobonyl (meth)acrylate, adamentyl (meth)acrylate, methyl α-hydroxymethyl acrylate, ethyl α-hydroxymethyl acrylate, propyl α-hydroxymethyl acrylate, and butyl α-hydroxymethyl acrylate; one or more aromatic vinyls selected from the group consisting of styrene, α-methyl styrene, (o,m,p)-vinyl toluene, (o,m,p)-methoxy styrene, and (o,m,p)-chloro styrene; one or more unsaturated esters selected from the group consisting of vinyl methyl ether, vinyl ethyl ether, and allyl glycidyl ether; one or more imides selected from the group consisting of N-phenyl maleimide, N-(4-chlorophenyl)maleimide, N-(4-hydroxyphenyl)maleimide, and N-cyclohexylmaleimide; and a homopolymer or copolymer of one or more monomers selected from the group consisting of maleic anhydrides such as maleic anhydride and methyl maleic anhydride.

Meanwhile, a phase change ink composition of the present disclosure, as occasion demands, may further include a solvent, and the solvent may be used for controlling the viscosity of the phase change ink composition or controlling the amount of solids that become a pattern. Although content of the solvent is not limited, the content of the solvent may be an amount of 1000 parts by weight or less with respect to 100 parts by weight of the phase change material. For instance, the content of the solvent may be in a range of from 100 to 500 parts by weight or from 200 to 400 parts by weight. If the solvent is contained in the phase change ink composition in an amount of more than 1000 parts by weight with respect to 100 parts by weight of the phase change material, phase change of the phase change ink composition may not be smooth, and a phenomenon may be generated in which fine masses of the phase change material float on the solvent at room temperature.

Although the solvent is not limited, examples of the solvent may include methyl-3-methoxypropionate (a boiling point of 144° C. represented in parentheses hereinafter), ethylene glycol methyl ether (125° C.), ethylene glycol ethyl ether (135° C.), ethylene glycol diethyl ether (121° C.), isopropyl monoethylene glycol (143° C.), dibutyl ether (140° C.), ethyl pyruvate (120° C.), propylene glycol methyl ether (121° C.), n-butyl acetate (125° C.), isobutyl acetate (116° C.), isoamyl acetate (143° C.), ethyl butyrate (120° C.), propyl butyrate (143° C.), methyl lactate (145° C.), methyl-2-hydroxyisobutylate (137° C.), 2-methoxyethylacetate (145° C.), ethyleneglycol methylether acetate (145° C.), dibutyl ether (140° C.), cyclopentanone (131° C.), 2-hexanone (127° C.), 3-hexanone (123° C.), 5-methyl-2-hexanone (145° C.), 4-heptanone (145° C.), 1-methoxy-2-propanol (118° C.), 2-ethoxyethyl ether (185° C.), dipropylene glycol methyl ether (188° C.), 3-nonanone (188° C.), 5-nonanone (187° C.), 2,2,6-trimethylcyclohexanone (179° C.), cycloheptanone (179° C.), amyl butyrate (185° C.), butyl lactate (186° C.), ethyl-3-hydroxybutyrate (180° C.), propylene glycol diacetate (186° C.), dipropylene glycol methyl ether (189° C.), diethylene glycol monomethyl ether (194° C.), 4-ethylcyclohexanone (193° C.), 2-butoxyethylacetate (192° C.), diethylene glycol monoethyl ether (202° C.), butyrol lactone (204° C.), hexyl butylate (205° C.), diethylene glycol methyl ether acetate (209° C.), diethylene glycol butyl methyl ether (212° C.), tripropyl glycol dimethyl ether (215° C.), triethylene glycol dimethyl ether (216° C.), diethylene glycol ethyl ether acetate (217° C.), diethylene glycol butyl ether acetate (245° C.), 3-epoxy-1,2-propandiol (222° C.), ethyl-4-acetylbutyrate (222° C.), diethylene glycol monobutyl ether (231° C.), tripropyl glycol methyl ether (242° C.), diethylene glycol (245° C.), 2-(2-butoxyethoxy)ethylacetate (245° C.), catechol (245° C.), triethylene glycol methyl ether (249° C.) or diethylene glycol butyl ether, propylene glycol methyl ether acetate, and the like. The solvent has a boiling point that is preferably about 10° C. or higher than a phase change temperature of the phase change material added in the phase change ink composition, and the solvent is more preferably a solvent of which a phase is not separated by melting components of the phase change ink composition.

Meanwhile, the phase change ink composition of the embodiments of the present disclosure, as occasion demands, may further include one or more additives selected from the group consisting of a dispersant, an adhesion promoter, an antioxidant, an ultraviolet light absorber, and a thermal polymerization inhibitor. Although the additives are not limited, the additives may be contained in the phase change ink composition an amount of 100 parts by weight or less with respect to 100 parts by weight of the phase change material. For instance, the additives may be contained in the phase change ink composition in an amount range of from about 1 to about 50 parts by weight or from about 2 to about 30 parts by weight, the additives may not be contained in the phase change ink composition in an amount of more than 100 parts by weight since additional improving effects of physical properties of the phase change ink composition are insignificant, and costs for preparing the ink are increased.

Although the dispersant is not limited, examples of the dispersant may include one or more selected from the group consisting of Disperbyk product groups of BYK-Chemie, TEGO disperse product groups of the Evonik Corporation, Solsperse product groups of the Lubrizol Corporation, and products of other various companies.

Although the adhesion promoter is not limited, examples of the adhesion promoter may include one or more selected from the group consisting of vinyl trimethoxy silane, vinyl triethoxy silane, vinyltris(2-methoxyethoxy)-silane, N-(2-aminoethyl)-3-aminopropylmethyldimethoxy silane, N-(2-aminoethyl)-3-aminopropylmethyltrimethoxy silane, 3-aminopropyltriethoxy silane, 3-glycidoxypropyltriethoxy silane, 3-glycidoxypropylmethyldimethoxy silane, 2-(3,4-ethoxy cyclohexyl)ethyltrimethoxy silane, 3-chloropropylmethyldimethoxy silane, 3-chloropropyltrimethoxy silane, 3-methacryloxypropyltrimethoxysilane, and 3-mercaptopropyltrimethoxy silane.

Further, although the antioxidant is not limited, examples of the antioxidant may include 2,2-thiobis(4-methyl-6-t-butylphenol), 2,6-g,t-butylphenol, and the like, examples of the ultraviolet light absorber may include 2-(3-t-butyl-5-methyl-2-hydroxyphenyl)-5-chloro-benzotriazole, alkoxy benzophenone, and the like, and examples of the thermal polymerization inhibitor may include hydroquinone, p-methoxy phenol, di-t-butyl-p-cresol, pyrogalol, t-butyl catechol, benzoquinone, 4,4-thiobis(3-methyl-6-t-butylphenol), 2,2-methylenebis(4-methyl-6-t-butylphenol), 2-mercaptoimidazole, and the like.

Meanwhile, the phase change ink composition preferably has a melting point of from about 50° C. to about 120° C. For instance, the phase change ink composition may have a melting point range of from about 60° C. to about 110° C. or from about 80° C. to about 100° C. If the phase change ink composition has a melting point of 50° C. or lower, it may be difficult to form fine patterns due to spreading of the droplets since droplets are not sufficiently hardened for a short time when discharging the phase change ink composition at room temperature to form patterns. If the phase change ink composition has a melting point of 120° C. or higher, a device of discharging the phase change ink composition should be heated to a temperature of 130° C. or higher. This may make it difficult to perform a discharging operation of the phase change ink composition since the discharging device does not have sufficient heat resistance at the temperature of 130° C. or higher.

The phase change ink composition according to the embodiments of the present invention is in a liquid state at a condition that the phase change ink composition is heated, but is in a solid state at a condition that the phase change ink composition is cooled (ordinarily at room temperature). On the other hand, when the phase change ink composition is applied by inkjet coating, the phase change ink composition is cooled within several milliseconds if the phase change ink composition heated in a liquid state is elastically adhered onto a base material of room temperature because droplets of the phase change ink composition have a very small size of about several tens of picometers. Therefore, since the phase change ink composition is solidified even before the phase change ink composition is spread to form a thermodynamic equilibrium contact angle on the surface of a base material, the phase change ink composition may form a predetermined shaped pattern that is not dependent on surface energy and of the base material or surface tension of the ink.

Further, since the phase change ink composition according to the embodiments of the present embodiment of the disclosure includes a photopolymerization initiator, the pattern of the phase change ink composition has excellent stability after the phase change ink composition is cured by the irradiation of active energy rays. More concretely, a phase change ink composition according to the present embodiment of the disclosure maintains a solid state in a temperature range of from 50° C. to 200° C. although the phase change ink composition is reheated after the phase change ink composition is cured by the irradiation of active energy rays. Namely, the pattern of the phase change ink composition is stable because the phase change ink composition maintains a solid state without being in a liquid state before the phase change ink composition reaches a pyrolysis temperature of more than 200° C. to carry out the pyrolysis process.

Meanwhile, the light shielding pattern 40 formed by the phase change ink composition may be formed on top of the image generation unit 20 or on the bottom of the 3D filter layer 30 as illustrated in FIGS. 1 to 3. Although it is regardless to form the light shielding pattern 40 on top of the image generation unit 20 or on the bottom of the 3D filter layer 30, the light shielding pattern 40 may be formed on a top substrate of the image generation unit 20 in the point that it is easy to form and press the light shielding pattern in a method of manufacturing a stereoscopic image display device that is to be described later. The light shielding pattern 40 is formed on the top substrate of the image generation unit 20 since the top substrate of the image generation unit 20 is formed of a relatively hard material compared to the 3D filter layer, and it is more advantageous to conduct the pressing process of the light shielding pattern consequently.

As described above, right after discharging the phase change ink composition, the discharged phase change ink composition is promptly cooled and solidified so that fluidity of the phase change ink composition is removed. Therefore, a pattern having a predetermined width and height irrespective of surface energy of a discharge surface to which the phase change ink composition is discharged may be formed, and in addition, the distance between droplets of the phase change ink composition may be controlled to form patterns with various line heights and line widths. Further, since the shape of the pattern may be finely changed through heating, pressing, and the like before hardening a phase change ink, the phase change ink composition is effective in controlling the shape of the pattern more accurately. That is, when forming a light shielding pattern using a phase change ink composition of the present disclosure, a pattern with various aspect ratios may be formed using one type of ink, and the pattern shape is accurately controlled to display a light shielding pattern optimized to image display devices of various sizes.

Meanwhile, the light shielding pattern in the present disclosure preferably has a line width range of from 10 μm to 150 μm. For instance, the light shielding pattern may have a line width of from 20 μm to 100 μm or from 40 μm to μm. It may be difficult to suppress a cross-talk phenomenon if the light shielding pattern has a line width of less than 10 μm, and the light shielding amount is increased so that brightness or energy efficiency of the image display device may be reduced if the light shielding pattern has a line width of more than 150 μm.

Further, the light shielding pattern preferably has a line height range of from 0.3 μm to 5 μm. For instance, the light shielding pattern may have a line height of from 0.5 μm to 3 µm or from 0.8 µm to 2 µm. The light shielding effect may not be sufficient if the light shielding pattern has a line height of less than 0.3 µm, and air may be flow between the light shielding pattern and the 3D filter layer when adhering the 3D filter layer if the light shielding pattern has a line height of more than 5 µm.

Further, the light shielding pattern preferably has an aspect ratio (line height/line width) range of from about 1% to about 20%. For instance, the light shielding pattern may have an aspect ratio of from about 1% to about 10% or from about 1% to about 7%. When the light shielding pattern has an aspect ratio satisfying the numerical value range, the light shielding pattern has improved light shielding properties and provides a high adhesive force between the 3D filter layer and the substrate of the image generation unit.

Further, the light shielding pattern may includes a flat face formed on the top surface thereof since the light shielding extent is varied according to a position on the top surface so that indicated quality may be dropped if the top surface of the light shielding pattern is formed in a concave or convex shape without the flat face being formed on the top surface. The flat face means a flat surface having a low surface roughness. It is preferable that the flat face has a maximum roughness value $R_{max}$ of 100 nm or less, and it is more preferable that the flat face has a maximum roughness value $R_{max}$ of from 0.1 nm to 50 nm. The maximum roughness value $R_{max}$ means a height from a lowest point to a highest point. Further in the present disclosure, the flat face may have a width that is from about 50% to about 100%, preferably from about 60% to about 100%, with respect of the line width of the light shielding pattern since, if width and surface roughness of the flat face satisfy the numerical value ranges, relatively uniform light shielding effects are displayed in the total area of the pattern so that excellent cross-talk preventing effects and surface qualities may be obtained.

Next, the stereoscopic image display device of the embodiments of the present disclosure may further include a backlight unit 10 for supplying light to the image generation unit 20 as occasion demands. The backlight unit 10 may include a light source 11 and functional optical sheets. The functional optical sheets may include all functional optical sheets such as a light guide plate, a light collecting film, a lenticular lens film, a diffusion plate, and the like that are capable of improving uniformity or brightness of light heading from the backlight unit toward image generation unit. A detailed description of the functional optical sheets is omitted since the functional optical sheets are widely known in the relevant related art.

Meanwhile, the stereoscopic image display device of the embodiments of the present disclosure may further include an adhesion layer 50 between the image generation unit 20 and the 3D filter layer 30, and a light shielding pattern interposed between the image generation unit and the 3D filter layer by the adhesion layer 50 may be fixed without a position and shape thereof being changed. the adhesion layer 50 may have a thickness of within 50 µm to reduce a cross-talk phenomenon caused by an optical path difference.

Examples of the adhesion layer 50 may typically include transparent resin compositions based on an acryl resin, an epoxy resin, and a urethane resin. However, the examples of the adhesion layer are not limited to the transparent resin compositions, and may further include transparent and adhesive materials that are well known in the related art.

Stereoscopic image display devices according to other embodiments of the present disclosure are illustrated in FIGS. 2 and 3. The stereoscopic image display devices further include an adhesion layer 50 as shown in FIGS. 2 and 3. The adhesion layer may be formed to include a light shielding pattern formed on a top substrate 22 of the image generation unit as illustrated in FIG. 2, or the adhesion layer may be formed to include a light shielding pattern formed on the 3D filter layer 30 as illustrated in FIG. 3. However, as illustrated in FIG. 2, the shape of the adhesion layer may be formed to include a light shielding pattern formed on the top substrate 22 of the image generation unit because it is easier in terms of the process to form the light shielding pattern on the top substrate 22 of the image generation unit 20 as mentioned above.

Meanwhile, the stereoscopic image display device of the embodiments of the present disclosure may further include functional optical layers such as brightness improving films that are widely known in the related art in addition to the above-mentioned components to improve optical functions of the stereoscopic image display device.

Next, a method of manufacturing a stereoscopic image display device of the present disclosure is described.

A method of manufacturing a stereoscopic image display device of the present disclosure includes: (a) applying a phase change ink composition to a top of an image generation unit or a bottom of a 3D filter layer to form a light shielding pattern in a position corresponding to a boundary portion between a first region and a second region of the 3D filter layer; (b) disposing the 3D filter layer on top of the image generation unit; and (c) radiating active energy rays to cure the light shielding pattern.

Hereinafter, a method of forming a light shielding pattern using a phase change ink composition is described in detail according to an embodiment of the present disclosure.

First, (a) a phase change ink composition is applied to top of an image generation unit or a bottom of a 3D filter layer to form a light shielding pattern in a position corresponding to a boundary portion between a first region and a second region of the 3D filter layer. At this time, the phase change ink composition is applied in a liquid state and is then rapidly solidified to form a pattern at a low temperature of the atmosphere.

As described in the description of the stereoscopic image display device, the light shielding pattern may be positioned to correspond to the boundary portion between the first region and the second region of the 3D filter layer in order to prevent cross-talk.

Meanwhile, the applying process may be performed by methods of applying a phase change ink composition that are well known in the related art such as an inkjet printing method.

The applying process may be undertaken at a temperature of a melting point of the phase change ink composition or higher so as to apply the phase change ink composition in a liquid state. More concretely, the applying process may be performed at a temperature from Tb to (Tb+100° C.) if the phase change ink composition has a melting point of Tb because, when the phase change ink composition is applied in the temperature range, the phase change ink composition may be applied in a liquid state, and the phase change ink composition may be directly solidified in the process that the phase change ink composition is applied and brought into contact with a base material. If the applying process is performed at a temperature that is lower than Tb° C., the phase change ink composition may not be completely melted, but may be remained in a solid state so that the phase change ink composition may block an outlet of a coating device.

More concretely, the applying process is preferably performed at a temperature from 50° C. to 160° C. For instance, the applying process may be performed at a temperature from 60° C. to 140° C. or from 80° C. to 125° C. Although the applying temperature is varied depending on a melting point of the phase change ink composition, types of the coating device, and the like, the applying temperature is preferably a temperature from 50° C. to 160° C. when considering a price merit of the coating device.

As described above, since the phase change ink composition has a melting point that is higher than room temperature if the phase change ink composition is applied and exposed to the outside, the process of applying the phase change ink composition to a base material results in loss of heat to the atmosphere of room temperature so that temperature of the phase change ink composition may be dropped to a melting point or lower before the phase change ink composition is solidified. Therefore, if a light shielding pattern is formed using a phase change ink composition of the present disclosure, although surface energy or surface tension of a base material coated with the phase change ink composition is not considered, limitations in the related art may be solved by controlling spreading of droplets of the phase change ink composition on the base material.

Next, after the light shielding pattern is formed, (b) the 3D filter layer is disposed on top of the image generation unit. Since the process (b) is in a state that the light shielding pattern is not completely cured, the top surface of the light shielding pattern is flattened as the light shielding pattern is being pressed when the 3D filter layer is disposed.

As occasion demands, the light shielding pattern may be pressed after performing the process (a) or the process (b) in order to further improve flatness of the light shielding pattern.

The pressing process may be preferably performed at a temperature from (Tb−20° C.) to (Tb+15° C.) when the phase change ink composition has a melting point of Tb. For instance, the pressing process may be performed at a temperature from (Tb−15° C.) to (Tb+10° C.) or from (Tb−10° C.) to (Tb+5° C.) since, if pressing is conducted in the temperature range, flattening may be carried out more accurately as some flexibility is being given to the light shielding pattern by heat. If the light shielding pattern is pressed to a temperature that is lower than (Tb−20° C.), flexibility is not given to the light shielding pattern so that a flat surface may not be even formed on the light shielding pattern. If the light shielding pattern is pressed to a temperature that is higher than (Tb+15° C.), excessive flexibility is given to the light shielding pattern so that a desired shape of the light shielding pattern may not be obtained due to the collapse in shape of the light shielding pattern.

Meanwhile, the pressing operation may be preferably conducted at a pressure of from about 0.01 MPa to about 50 MPa. For instance, the pressing process may be conducted at a pressure of from about 0.03 MPa to about 30 MPa or from about 0.05 MPa to about 15 MPa. The pressure may be appropriately changeable according to a line width and a line height of the light shielding pattern desired by a designer. If the pressure is 0.01 MPa or less, a pressure to be applied is weak so that flatness of the light shielding pattern may not be uniform, or desired line width or line height of the light shielding pattern may not be reached. Further, if the pressure is 50 MPa or more, the pressure to be applied is so high that the top of the light shielding pattern may have excellent flatness, but lines of the light shielding pattern may be unexpectedly connected to one another.

On the other hand, the pressing process may be conducted by methods widely known in the related art. For instance, although the pressing process may be performed by a pressing roll, a flat plate, and the like, the methods are not limited thereto.

An embodiment of performing the pressing process by a pressing roll may be conducted by a method of applying a phase change ink composition to the top substrate of the image generation unit or a base material of the 3D filter layer to form a light shielding pattern, and moving the base material and pressing roll relatively to each other to press the light shielding pattern. Even in this case, the pressing process is not limited to the method, and may be performed by various methods widely known in the related art.

Further, if the pressing operation is performed by using a pressing roll, the pressing process may be performed so that the pressing roll and the base material having the light shielding pattern formed thereon are progressed to a relative speed of from about 1 m/s to about 150 m/s. For instance, the pressing process may be performed so that the pressing roll and the base material having the light shielding pattern formed thereon are progressed to a relative speed of from about 3 m/s to about 140 m/s or from about 5 m/s to about 130 m/s. It is required to control the relative speed since the relative speed is not related to a pressing time, but it is related to a process speed of the pattern forming process, and the substrate may be subjected to vertical microvibrating as the process speed increases.

On the other hand, another embodiment in which the pressing process is conducted by a flat plate may include performing the pressing process using the flat plate in a direction that is opposite to a base material surface having the pattern formed thereon.

Meanwhile, although the pressing process is not limited, the pressing process may be conducted in a state that a protection film, a release film or other films may be adhered to or laminated onto the top of the light shielding pattern since, if the phase change ink composition is pressed in a state that the phase change ink composition is not completely solidified, the phase change ink composition is adhered to a pressing device to result in a collapse in shape of the light shielding pattern and to cause defects to be produced in the process of continuously forming the light shielding pattern. The phase change ink composition may be prevented from being adhered to the pressing device and minimize defects even in the continuous process by laying up the protection film or the release film on top of the light shielding pattern and pressing the protection film or the release film on the light shielding pattern.

Next, the method of manufacturing a stereoscopic image display device of the present disclosure includes (c) radiating active energy rays so as to cure the light shielding pattern. The process (c) is conducted to fix the light shielding pattern. Since the phase change ink composition has a nature that its phase is changed according to temperature, a light shielding pattern formed is weak to temperature changes so that the pattern may be deformed by heat. For instance, heat may be generated due to electronic devices in the driving process of the stereoscopic image display device, and an internal temperature of the stereoscopic image display device may come close to a melting point of the phase change ink composition by the generated heat. In this case, the light shielding pattern may be flexible or collapsed. However, if active energy rays are irradiated to cure the light shielding pattern as in the present disclosure, the pattern is fixed so that it may maintain its shape regardless of temperature changes.

The curing process of the present disclosure may be performed by various methods widely known in the related art. For instance, the curing process may be performed through the irradiation of ultraviolet rays, but the curing process is not limited thereto. For instance, the process (c) may be carried out by irradiating ultraviolet rays in an exposed light amount of 100 mJ/cm² for about 5 to about 100 seconds. The curing process may be performed by allowing an ordinary technician of the related art to appropriately control the exposed UV light amount or the UV light exposing time.

Figure 4:
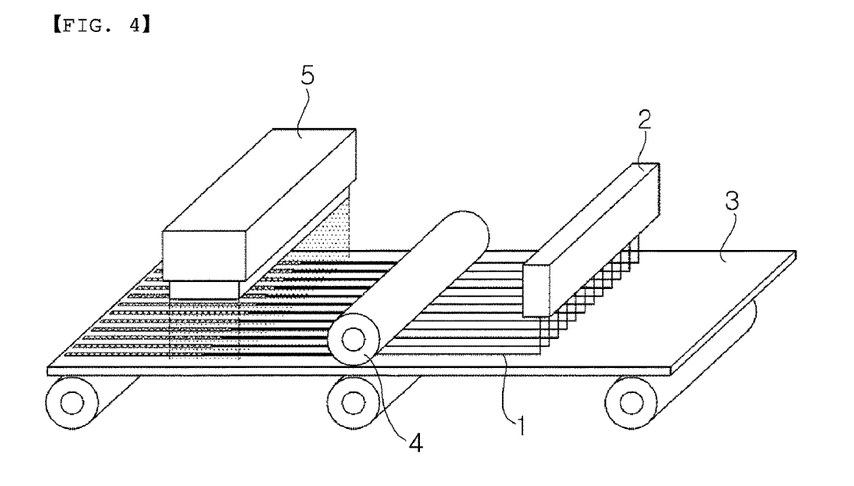
FIG. 4 is a schematic view illustrating a method of forming a light shielding pattern according to an embodiment of the present disclosure.

Meanwhile, FIG. 4 is a schematic view in which a light shielding pattern according to an embodiment of the present disclosure is formed. As illustrated in FIG. 4, a light shielding pattern of the embodiment of the present disclosure may be formed by a method of curing the light shielding pattern by applying a phase change ink composition 1 to one surface of a base material 3 through an inkjet head 2, pressing the applied phase change ink composition using a pressing unit such as pressing rolls 4, and radiating active energy rays to the pressed phase change ink composition using a ultraviolet irradiating device 5, and the like. Although a process of pressing the light shielding pattern using the pressing rolls 4 suitable for a continuous process is disclosed in FIG. 4, the present disclosure is not limited thereto.

MODE FOR INVENTION

Hereinafter, the present disclosure will be described in more detail through examples.

Example 1

50 g of tripropylene glycol diacrylate, 17 g of trimethylol propane triacrylate, 30 g of tetradecanoic acid, g of IRGACURE 369 (2-benzyl-2-dimethylamino-1-(4-morpholinophenyl)-butane-1-on) produced by the BASF Corporation, and 5 g of a dye SOLVENT BLACK 27 were stirred and mixed at 80° C. to prepare a phase change ink composition A.

After the phase change ink composition A was injected into a reservoir of an inkjet device, line patterning was performed to form a line pattern by jet-injecting the phase change ink composition A at a dot pitch of 40 μm onto a glass substrate and a PET film, respectively. The jet-injecting process was conducted by setting the temperature of the reservoir to be 70° C., using a SE-128 head manufactured by the Dimactix Corporation, maintaining an applied voltage within a range of from 60 V to 80 V, and using 128 nozzles. After the jet-injecting process was performed, the line pattern was pressed at a contract pressure condition of 20 μm (approximately 0.6 MPa), and ultraviolet rays were radiated onto the pressed line pattern in an amount of 50 mW/cm2 for 10 seconds to cure the line pattern, wherein the contract pressure is represented by a deformed length of a printing object measured at a point of a soft roll when a printing pressure is applied to the printing object.

Example 2

150 g of tripropylene glycol diacrylate, 50 g of trimethylol propane triacrylate, 500 g of octadecanol, 20 g of IRGACURE 819 (2,4,6-trimethylbenzoyl diphenylphosphine oxide) produced by the BASF Corporation, 80 g of butyl carbitol, and 200 g of Orasol produced by the BASF Corporation (a dye SOLVENT BLACK 29) were stirred and mixed at 80° C. to prepare a phase change ink composition B.

After preparing the phase change ink composition B, a line pattern was formed in the same method as Example 1 except that the phase change ink composition B was used instead of the phase change ink composition A.

Example 3

After 100 parts by weight of trimethylol propane triacrylate were added to a dispersion in which 20 parts by weight of carbon black were dispersed into propylene glycol methyl ether acetate, the materials were injected into a rotary type evaporator and heated to 50° C. in a reduced pressure condition so as to remove propylene glycol methyl ether acetate having a high volatility and prepare a pigment dispersion containing less than 5 parts by weight of propylene glycol methyl ether acetate.

100 g of dipentaerythritol hexaacrylate, 500 g of docosanoic acid, 50 g of IRGACURE 819 (2,4,6-trimethylbenzoyl diphenylphosphine oxide) produced by the BASF Corporation, and 250 g of diethyleneglycol butyl ether were added to 250 g of the pigment dispersion, and were stirred and mixed at 80° C. to prepare a phase change ink composition C.

After preparing the phase change ink composition C, a line pattern was formed in the same method as Example 1 except that the phase change ink composition C was used instead of the phase change ink composition A.

Example 4

50 g of dipentaerythritol hexaacrylate, 50 g of dipropyleneglycol diacrylate, 500 g of docosanol, 50 g of IRGACURE 819 (2,4,6-trimethylbenzoyl diphenylphosphine oxide) produced by the BASF Corporation, and 450 g of diethyleneglycol butyl ether were added to 250 g of the pigment dispersion prepared in Example 3, and stirred and mixed at 80° C. to prepare a phase change ink composition D.

After preparing the phase change ink composition D, a line pattern was formed in the same method as Example 1 except that the phase change ink composition D was used instead of the phase change ink composition A.

Example 5

100 g of dipentaerythritol hexaacrylate, 500 g of docosanol, 50 g of IRGACURE 369 (2-benzyl-2-dimethylamino-1-(4-morpholinophenyl)-butane-1-on) produced by the BASF Corporation, and 450 g of diethyleneglycol butyl ether were added to 250 g of the pigment dispersion prepared in Example 3, and stirred and mixed at 80° C. to prepare a phase change ink composition E.

After preparing the phase change ink composition E, a line pattern was formed in the same method as Example 1 except that the phase change ink composition E was used instead of the phase change ink composition A.

Comparative Example 1

30 g of a dispersion in which 20 parts by weight of carbon black were dispersed into propylene glycol methyl ether acetate, 20 g of a polymer binder containing 40 parts by weight of solids, 8 g of dipentaerythritol hexaacrylate, 2 g of IRGACURE 369 produced by the BASF Corporation, and 20 g of butyl carbitol were stirred to prepare a phase change ink composition F in which a phase change material was not contained.

After the phase change ink composition F was injected into a reservoir of an inkjet device, the phase change ink composition F was jet-injected at a dot pitch of 40 µm onto a glass substrate and a PET film, respectively, so as to form a line pattern. The jet-injecting process was conducted by setting the temperature of the reservoir to be 22° C., using a SE-128 head manufactured by the Dimactix Corporation, maintaining an applied voltage within a range of from 60 V to 80 V, and using 128 nozzles.

Comparative Example 2

A non-photoinitiator containing phase change ink composition G having a melting point of 135° C. produced by the Xerox Corporation was prepared.

After the phase change ink composition G was injected into a reservoir of an inkjet device, the temperature of the reservoir was set to be 70° C., and a jet-injecting process was carried out. However, since the phase change ink composition was not discharged, no pattern could be formed.

Comparative Example 3

100 g of dipentaerythritol hexaacrylate, 500 g of docosanoic acid, and 250 g of diethyleneglycol butyl ether were added to 250 g of the pigment dispersion prepared in Example 3, and stirred and mixed at 80° C. to prepare a phase change ink composition H.

After preparing the phase change ink composition H, a line pattern was formed in the same method as Example 1 except that the phase change ink composition H was used instead of the phase change ink composition A.

Experimental Example 1

Average line widths and average line heights of the line patterns of Examples 1 to 5 and Comparative Example 1 were measured before and after pressing the line patterns. Measurement results were illustrated in the following Table 1. However, in case of Comparative Example 1, measured line widths were approximate values, and the line width of the pattern had severe deviation over parts of a substrate surface due to the influence of uneven surface energy characteristics of the substrate surface.

It can be seen from Table 1 that, although types of the base material were varied, line widths and line heights of the patterns were not greatly changed, and relatively high aspect ratios were obtained in cases of the patterns formed according to Examples 1 to 5. On the contrary, line widths and line heights were greatly changed according to types of the base material, and aspect ratios were very low in case of Comparative Example 1. Further, in the case of Comparative Example 1, line widths and line heights were uneven according to positions even on the same base material.

Experimental Example 2

Figure 5:
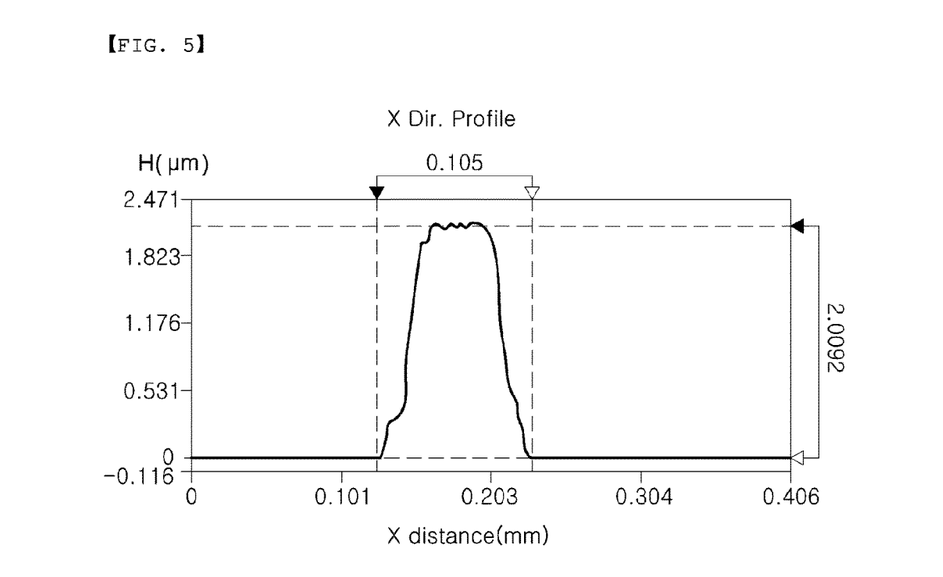
FIG. 5 is a view illustrating a profile of a cross section of a line pattern of Example 5 taken in a direction perpendicular to a glass substrate and a pattern length direction.

A three-dimensional shape of the line pattern formed on the glass substrate of Example 5 was confirmed by using a three-dimensional shape measuring instrument manufactured by Nanosystems Inc. FIG. 5 illustrates a profile of a cross section of the line pattern taken in a direction perpendicular to the glass substrate and the length of the line pattern. In FIG. 5, the horizontal axis (X axis) represents the line width of the pattern in millimeters (mm), and the vertical axis (H) represents the line height of the pattern.

Referring to FIG. it can be seen that a flat surface exists on top of the line pattern, and the flat surface has a maximum height ($R_{max}$) of 100 nm or less.

Experimental Example 3

Line patterns were formed on a glass substrate using the phase change ink compositions of Examples 1 to 5 and Comparative Example 3, the glass substrate on which the line patterns were formed was placed and heated on a hot plate having a temperature of 70° C. for 1 minute, and shapes of the patterns were observed by the naked eye.

As results of the observation, it could be confirmed that pattern shapes were rarely changed even after the line patterns were heated in case of the line patterns formed using the phase change ink compositions of Examples 1 to 5. On the contrary, it could be confirmed that line pattern formed using the phase change ink composition of Comparative Example 3 were melted and spread.

Example 6

After the phase change ink composition C prepared according to Example 3 was injected into a reservoir of an inkjet device, a light shielding pattern was formed on a

TABLE 1

| | Classification | | *E 1 | E 2 | E 3 | E 4 | E 5 | **CE 1 |
|---|---|---|---|---|---|---|---|---|
| Glass substrate | Before pressing | ***LW (µm) | 85 | 64 | 85 | 78 | 94 | 200 |
| | | ****LH (µm) | 3.4 | 3.2 | 1.6 | 1.8 | 2.2 | 0.8 |
| | | *****AR (%) | 4 | 5 | 1.8 | 2.3 | 2.3 | 0.4 |
| | After pressing | LW (µm) | 103 | 92 | 104 | 104 | 105 | — |
| | | LH (µm) | 2.8 | 2.2 | 1.3 | 1.4 | 2.0 | — |
| | | AR (%) | 2.7 | 2.4 | 1.25 | 1.35 | 1.9 | — |
| PET film | Before pressing | LW (µm) | 8.5 | 66 | 82 | 76 | 96 | 170 |
| | | LH (µm) | 3.2 | 3.1 | 1.7 | 1.8 | 2.1 | 0.9 |
| | | AR (%) | 3.76 | 4.7 | 2.07 | 2.37 | 2.19 | 0.5 |
| | After pressingh | LW (µm) | 102 | 90 | 103 | 98 | 103 | — |
| | | LH (µm) | 2.7 | 2.3 | 1.3 | 1.4 | 2.0 | — |
| | | AR (%) | 2.65 | 2.56 | 1.26 | 1.43 | 1.94 | — |

*E: Example,
**CE: Comparative Example,
***LW: Line width,
****LH: Line height,
*****AR: Aspect ratio substrate of a 47 inch Full-HD LCD panel (image generation unit) using a QS-256 head manufactured by the Dimactrix Corporation. At that time, the temperature of the reservoir was set to be 70° C., and discharging of the phase change ink composition C was performed at a dot pitch condition of 30 µm. Further, the light shielding pattern was formed in a manner such that the light shielding pattern was disposed at a position completely corresponding to a black matrix of an LCD color filter. After forming the light shielding pattern, a 3D filter layer was pressed and adhered onto the light shielding pattern, and ultraviolet rays were radiated onto the light shielding pattern to cure the pattern, thereby fabricating a stereoscopic image display device. The pattern had a width of about 50 µm.

Comparative Example 4

A three-dimensional filter was pressed and adhered onto an LCD panel to manufacture a stereoscopic image display device.

Comparative Example 5

After the phase change ink composition F prepared according to Comparative Example 1 was injected into a reservoir of an inkjet device, a light shielding pattern was formed on a substrate of a 47 inch Full-HD LCD panel (image generation unit) using a QS-256 head manufactured by the Dimactrix Corporation. The temperature of the reservoir was set to be 70° C., and discharging of the phase change ink composition C was performed at a dot pitch condition of 30 µm. Further, the light shielding pattern was formed in a manner such that the light shielding pattern was disposed at a position completely corresponding to a black matrix of an LCD color filter. After forming the light shielding pattern, a 3D filter layer was pressed and adhered onto the light shielding pattern, thereby fabricating a stereoscopic image display device. The pattern had a width of about 110 µm.

Experimental Example 4

Cross-talk of the stereoscopic image display devices of Example 6 and Comparative Examples 4 and 5 were measured using a brightness meter BM7 manufactured by the Topcon Corporation. The cross-talk was measured with respect to a vertical viewing angle, and measurement results were illustrated in FIG. 6.

Figure 6:
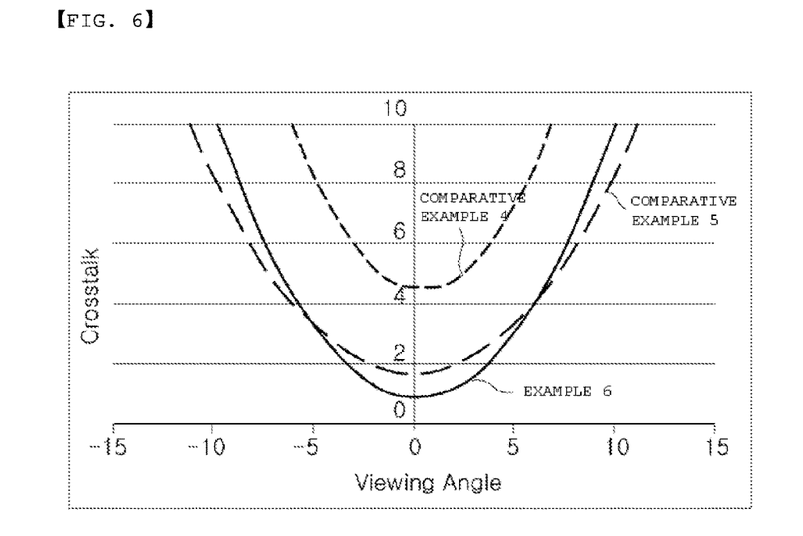
FIG. 6 is a graph showing measurement results of cross-talk of Experimental Example 4.

As illustrated in FIG. 6, it can be seen that cross-talk in front of the stereoscopic image display device of the Example 6 has a very low value of less than 1%, but cross-talk in front of the stereoscopic image display devices of Comparative Examples 4 and 5 has high values of 4% or higher and 1.5% or higher, respectively. Further, if an optimal viewing range is assumed to be a cross-talk level of 10% or less, a viewing angle range with cross-talk of 10% or less is from about −6 to about 6 degrees in Comparative Example 4, and a viewing angle range with cross-talk of 10% or less is wide, from about −10 to about 10 degrees in Example 6 and Comparative Example 4. Further, although it is not illustrated, the stereoscopic image display device of Comparative Example 5 was not appropriate as a display because the front brightness of the stereoscopic image display device of Comparative Example 5 was decreased by 20% or more as compared with that of stereoscopic image display device of Example 6.

The invention claimed is:

1. A stereoscopic image display device comprising:
   an image generation unit generating a left-eye image and a right-eye image;
   a 3D filter layer disposed above the image generation unit, the 3D filter layer comprising a first region through which the right-eye image passes and a second region through which the left-eye image passes; and
   a light shielding pattern disposed between the image generation unit and the 3D filter layer in a position corresponding to a boundary portion between the first region and the second region,
   wherein the light shielding pattern is formed of a phase change ink composition.

2. The stereoscopic image display device of claim 1, wherein the phase change ink composition comprises:
   3 to 93 parts by weight of a phase change material;
   3 to 30 parts by weight of a coloring agent;
   3 to 90 parts by weight of a reactive monomer, an oligomer, or a mixture thereof; and
   0.1 to 10 parts by weight of a photopolymerization initiator, a photo-crosslinking sensitizer, or a mixture thereof.

3. The stereoscopic image display device of claim 1, wherein the phase change ink composition has a melting point of from 50° C. to 120° C.

4. The stereoscopic image display device of claim 1, wherein the phase change ink composition is in a solid state at a temperature ranging from 50° C. to 200° C. although the phase change ink composition is reheated after the phase change ink composition is cured with active energy rays.

5. The stereoscopic image display device of claim 1, wherein the light shielding pattern has a line width of from 10 µm to 150 µm.

6. The stereoscopic image display device of claim 1, wherein the light shielding pattern has a line height of from 0.3 µm to 5 µm.

7. The stereoscopic image display device of claim 1, wherein the light shielding pattern has an aspect ratio of from 1% to 20%.

8. The stereoscopic image display device of claim 1, wherein the light shielding pattern comprises a flat surface formed on a top thereof, wherein the flat surface has a maximum roughness value $R_{max}$ of 100 nm or less.

9. The stereoscopic image display device of claim 1, further comprising an adhesion layer between the image generation unit and the 3D filter layer.

10. A method of manufacturing a stereoscopic image display device, the method comprising:
    applying a phase change ink composition to a top of an image generation unit or a bottom of a 3D filter layer to form a light shielding pattern in a position corresponding to a boundary portion between a first region and a second region of the 3D filter layer;
    disposing the 3D filter layer on top of the image generation unit; and
    radiating active energy rays so as to cure the light shielding pattern.

11. The method of claim 10, wherein the applying of the phase change ink composition is performed at a temperature from Tb to (Tb+100° C.) when the phase change ink composition has a melting point of Tb.

12. The method of claim 10, further comprising pressing the light shielding pattern after the applying of the phase change ink composition or the disposing of the 3D filter layer.

13. The method of claim 12, wherein the pressing of the light shielding pattern is performed at a temperature from (Tb−20° C.) to (Tb+15° C.) when the phase change ink composition has a melting point of Tb.

14. The method of claim 12, wherein the pressing of the light shielding pattern is performed at a pressure of from 0.01 MPa to 50 MPa.

\* \* \* \* \*